United States Patent
Sadana et al.

(10) Patent No.: US 9,334,337 B2
(45) Date of Patent: May 10, 2016

(54) ENHANCED WATER SWELLABLE COMPOSITIONS

(71) Applicants: Anil K. Sadana, Houston, TX (US); Xiao Wang, Houston, TX (US); James R. Korte, Katy, TX (US)

(72) Inventors: Anil K. Sadana, Houston, TX (US); Xiao Wang, Houston, TX (US); James R. Korte, Katy, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/209,057

(22) Filed: Mar. 13, 2014

(65) Prior Publication Data

US 2015/0210825 A1   Jul. 30, 2015

Related U.S. Application Data

(63) Continuation-in-part of application No. 14/163,553, filed on Jan. 24, 2014.

(51) Int. Cl.

| C08K 9/04 | (2006.01) |
|---|---|
| C08K 9/12 | (2006.01) |
| C08F 2/44 | (2006.01) |
| C08F 220/56 | (2006.01) |

(52) U.S. Cl.
CPC ... *C08F 2/44* (2013.01); *C08K 9/04* (2013.01); *C08K 9/12* (2013.01); *C08K 2201/011* (2013.01)

(58) Field of Classification Search
CPC ........... C08L 23/06; C08L 23/26; C08K 9/00; C08K 3/346; C08K 9/04; C08K 9/12; C08J 5/18; C08F 2/44; C08F 220/56
USPC ................................................ 524/35, 789
See application file for complete search history.

(56) References Cited

U.S. PATENT DOCUMENTS

| 4,290,932 A | 9/1981 | Wright |
| 4,367,323 A | 1/1983 | Kitamura et al. |
| 4,506,062 A | 3/1985 | Flesher et al. |
| 4,532,298 A | 7/1985 | Kimura et al. |
| 5,275,773 A | 1/1994 | Irie et al. |
| 5,408,006 A | 4/1995 | Rebre et al. |
| 6,159,591 A | 12/2000 | Beihoffer et al. |
| 6,333,109 B1 | 12/2001 | Harada et al. |
| 6,710,104 B2 | 3/2004 | Haraguchi |
| 7,365,120 B2 | 4/2008 | Haraguchi et al. |
| 7,373,991 B2 | 5/2008 | Vaidya et al. |
| 7,398,606 B2 | 7/2008 | Belkhiria et al. |
| 7,713,623 B2 | 5/2010 | Matsuda et al. |
| 7,866,393 B2 | 1/2011 | Badalamenti et al. |
| 7,901,771 B2 | 3/2011 | Butters et al. |
| 7,993,892 B2 | 8/2011 | Takada et al. |
| 8,273,817 B2 | 9/2012 | Gustafson et al. |
| 2002/0055580 A1* | 5/2002 | Lorah et al. .................. 524/445 |
| 2004/0156994 A1 | 8/2004 | Wiese et al. |
| 2005/0245393 A1 | 11/2005 | Herfert et al. |
| 2007/0161734 A1* | 7/2007 | Fudemoto ................ C08J 5/005 524/445 |
| 2010/0218949 A1 | 9/2010 | Badalamenti et al. |
| 2010/0256298 A1 | 10/2010 | Wu et al. |
| 2011/0257333 A1 | 10/2011 | Adam et al. |
| 2012/0175134 A1 | 7/2012 | Robisson et al. |
| 2012/0208934 A1 | 8/2012 | Korte et al. |
| 2013/0075096 A1 | 3/2013 | Khalfallah et al. |
| 2013/0096038 A1 | 4/2013 | Kim et al. |
| 2013/0123394 A1 | 5/2013 | Breach et al. |
| 2013/0269787 A1 | 10/2013 | Choi et al. |
| 2014/0187413 A1* | 7/2014 | Lagaron Cabello et al. ... 502/62 |

FOREIGN PATENT DOCUMENTS

| EP | 172724 A2 | 2/1986 |
| EP | 2178973 B1 | 1/2013 |
| WO | WO 2012/164131 | * 12/2012 |

OTHER PUBLICATIONS

Berger et al., "Microgel/Clay Nanohybrids As Responsive Scavenger Systems," Polymer, Jun. 30, 2010, vol. 51., No. 17, pp. 3829-3835.
Chen et al., "A Transparent Laponite Polymer Nanocomposite Hydrogel Synthesis via In-Situ Copolymerization of Two Ionic Monomers," Applied Clay Science, Mar. 1, 2013, vol. 72, pp. 196-200.
Contin et al., "Metal Nanoparticles Inside Microgel/Clay Nanohybrids: Synthesis, Characterization and Catalytic Efficiency in Cross-Coupling Reactions," Journal of Colloid and Interface Science, Oct. 9, 2013, vol. 414, pp. 41-45.
Haraguchi et al., "Nanocomposite Hydrogels: A Unique Organic-Inorganic Network Structure with Extraordinary Mechanical, Optical, and Swelling/De-swelling Properties"; Advanced Materials; vol. 14; No. 16; 2002; pp. 1120-1124.
Haraguchi, "Molecular Characteristics of Poly(N-isopropylacrylamide) Separated from Nanocomposite Gels by Removal of Clay from the Polymer/Clay Network"; Macromolecular Rapid Communications; vol. 31; 2010; pp. 718-723.
Haraguchi, "Nanocomposite Hydrogels"; Elsevier Ltd., Current Opinion in Solid State and Materials Science, vol. 11, 2007, pp. 47-54.
International Search Report and Written Opinion of the International Searching Authority; International Application No. PCT/US2014/072210; International Filing Date Dec. 23, 2014; Date of Mailing Apr. 14, 2015; 13 pages.

* cited by examiner

*Primary Examiner* — Rabon Sergent
*Assistant Examiner* — Deve E Valdez
(74) *Attorney, Agent, or Firm* — Cantor Colburn LLP

(57) ABSTRACT

Nanocomposite microgel particles containing a three-dimensional network, containing a water-swellable nanoclay and an organic network polymer. The nanocomposite microgel particles include primary nanocomposite microgel particles having a mean diameter of 1 to 10 micrometers. Also disclosed is a method of manufacture for the nanocomposite microgel particles. The nanocomposite microgel particles can be used together with a base polymer to provide water swellable compositions.

20 Claims, 3 Drawing Sheets

ENHANCED WATER SWELLABLE COMPOSITIONS

CROSS-REFERENCE TO RELATED APPLICATION

This application is a continuation-in-part application of U.S. Nonprovisional patent application Ser. No. 14/163,553, filed on Jan. 24, 2014, which is incorporated by reference in its entirety herein.

BACKGROUND

This disclosure relates to nanocomposite microgel compositions comprising a polymer and a water-swellable mineral nanoclay, their methods of manufacture, and their uses. The disclosure also relates to water swellable compositions comprising the nanocomposite microgels and articles containing the water swellable compositions.

Hydrogels are hydrophilic polymer networks that can absorb large amounts of water from aqueous solutions without being dissolved. These networks can be synthesized through chemical or physical cross-linking.

Nanocomposite microgels have a three-dimensional network structure and a water-swellable mineral nanoclay crosslinking the network structure. Nanocomposite microgels can possess enhanced swelling properties based on their unique polymer/nanoclay network structure, for example the ability to dramatically swell or shrink in response to a variety of external stimuli such as temperature, pH, ionic strength, electric field, and enzyme activities. These properties make them useful in a wide variety of applications, for example, swellable rubber compounds for the oil and gas industry, superabsorbents for hygienic and agricultural applications.

The nanocomposite hydrogel is typically manufactured by the polymerization of water-soluble monomers in an aqueous medium in the presence of a water-swellable nanoclay, and an aqueous polymerization initiator. Thus formed hydrogel is then isolated, and can be dried to form a nanocomposite microgel. One drawback to the nanocomposites is that they are obtained as relatively large particles, for example on the order of 100 to 300 micrometers. Another drawback to thus formed nanocomposite hydrogels is that they are synthesized in bulk form, the specifics of which are determined by the shape of the mold, for example thin film, sheets, rods, hollow tube, cubes, spheres, and bellows. Even if size reduction of the nanocomposite microgels can be achieved by high-energy physical means, such as ball milling, hammer milling, or knife milling, typically results in large particle sizes and a broad particle size distribution, which requires further subsequent classification and waste of the particles not within the desired range.

There accordingly remains a need in the art for nanocomposite microgels having improved particles size distribution in the lower ranges and exhibiting better elastomeric behavior, greater swelling ratio and faster swelling kinetics compared to conventional super absorbent polymer (SAP) gels. There also remains a need for more efficient methods for the production of such nanocomposite micro gels.

SUMMARY

Disclosed herein are nanocomposite microgel particles comprising a three-dimensional network comprising a water-swellable nanoclay, and an organic network polymer; wherein the nanocomposite microgel particles comprise primary nanocomposite microgel particles having a mean diameter of 1 to 10 micrometers.

Also disclosed is a method for the manufacture of the above-described nanocomposite microgel particles, the method comprising forming an water-in-oil emulsion from an aqueous phase comprising a water-swellable nanoclay, and a monomer composition; an oil phase comprising an emulsifier; and a polymerization initiator; polymerizing the monomer composition in the emulsion to form the nanocomposite microgel; isolating the nanocomposite microgel; and drying the isolated nanocomposite microgel, to provide primary nanocomposite microgel particles.

In another aspect, disclosed herein is a water swellable composition comprising: a base polymer; and nanocomposite microgel particles comprising a three-dimensional network comprising a water-swellable nanoclay; and an organic network polymer; wherein the nanocomposite microgel particles comprise primary nanocomposite microgel particles having a mean diameter of 1 to 10 micrometers.

An article comprising the water swellable composition is also disclosed.

DETAILED DESCRIPTION

Figure 1:
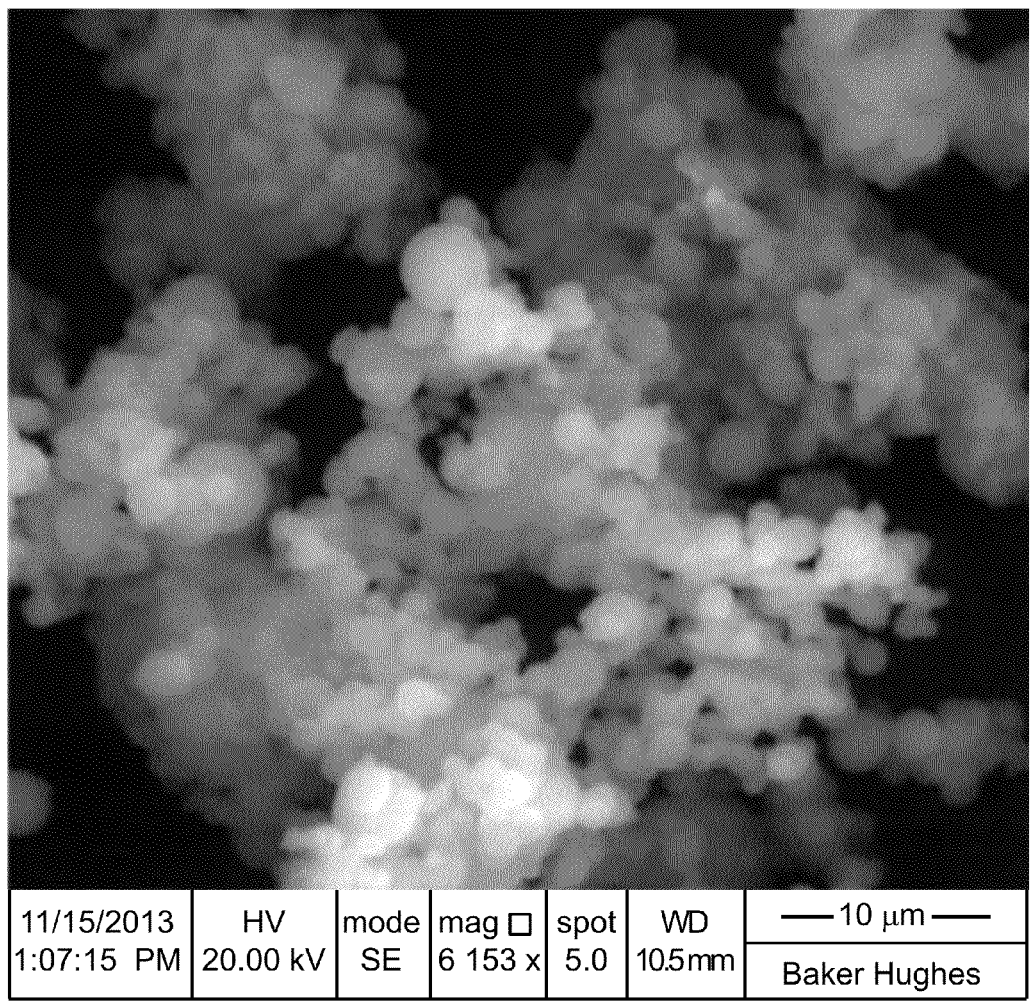
FIG. 1 shows a scanning electron microscopy (SEM) image of nanocomposite microgels.

The inventors hereof have discovered a method for the manufacture of primary nanocomposite microgel particles having a particle mean diameter of 1 to 10 micrometers, i.e., very small particles having a narrow particle size distribution. In the method, the nanocomposite microgel is manufactured in a water-in-oil emulsion, and the small primary particles are obtained directly from the emulsion. Thus, in an important feature, the micrometer-sized primary particles are obtained "as-synthesized," without a high-energy physical size reduction step after the particles are synthesized. The particles are not formed in a mold, and thus can have a fluffy, powder-like form. The particles have comparable or superior mechanical, water absorption and swelling properties compared to those produced by prior art methods.

In particular, a method of manufacture of nanocomposite microgel particles comprises forming an aqueous phase by combining a nanoclay, preferably a water-swellable nanoclay, a monomer composition for forming a network polymer, and a polymerization initiator; forming an oil phase comprising an oil and a surfactant; forming an water-in-oil emulsion from the aqueous phase and the oil phase; and polymerizing the monomer compositions in the water-in-oil emulsion to form the nanocomposite microgel.

In an embodiment, the nanoclay acts as a multifunctional cross-linker of the monomer compositions. Cross-linking of monomer compositions leads to formation of high molecular weight crosslinked polymers, for example, as high as $M_w=5.5\times10^6$ g mol$^{-1}$ as measured by gel-permeation chromatography. Without being bound by specific theory, cross-linking of the organic polymer compositions occurs such that the ionic and polar interactions at the clay-polymer interface lead to physical cross-linking. The resultant nanocomposite hydrogel with its unique organic-inorganic network structure exhibits excellent mechanical, optical, swelling/deswelling properties which can overcome the limitations of conventionally crosslinked hydrogels.

The nanoclay is a water-swellable mineral clay separated into a layered form, i.e., exfoliated. Thus, preferred nanoclays are insoluble in water but hydrate and swell to give clear and colorless colloidal dispersions. Preferred mineral clays swell and can be uniformly dispersed in an aqueous solution (water or a mixed solvent of water and an organic solvent), and can separate into single layers or a level close thereto in an aqueous medium. For example, water-swellable smectite or water-swellable mica can be used, specific examples of which include water-swellable hectorite, water-swellable montmorillonite, water-swellable saponite, and water-swellable synthetic mica, containing sodium as an interlayer ion. These mineral clays may also be used as a combination comprising at least one of the foregoing. In a specific embodiment, the nanoclay may be a synthetic layered hectorite magnesium lithium silicate such as Laponite.

The monomer composition comprises polymerizable monomers soluble in an aqueous medium, more particularly in water, which form the organic network comprising high molecular weight crosslinked polymer of the microgel upon polymerization. In an embodiment, each of the monomers is ethylenically unsaturated, preferably ethylenically monounsaturated. At least a portion of the monomers further each comprise a polar functional group that forms a bond to the nanoclay, for example a hydrogen bond, polar bond, ionic bond, coordinate bond or covalent bond.

Suitable polar functional groups can be nonionic or ionic groups. Specific examples of polar functional groups include amide groups, amino groups, acid groups, for example, carboxylic acid groups and sulfonic acid groups, tetra-substituted ammonium groups, ester groups, hydroxyl groups, silanol groups and epoxy groups. Preferred polar functional groups include amide groups, carboxylic acid groups and sulfonic acid groups. A combination of polar nonionic monomers and polar ionic monomers can be used.

Examples of water-soluble, polar, nonionic, ethylenically monounsaturated monomers include acrylamide, methacrylamide, N—($C_1$-$C_8$ alkyl)(meth)acrylamides such as N-methyl methacrylamide, N,N-di($C_1$-$C_8$ alkyl)acrylamides such as N,N-dimethyl acrylamide, vinyl alcohol, vinyl acetate, allyl alcohol, (meth)acrylic monomers having a sugar residue, (meth)acrylic monomers having a hydroxyl group, such as hydroxyethyl (meth)acrylate, acrylonitrile, methacrylonitrile, and a combination comprising at least one of the foregoing.

The polar, ionic, ethylenically unsaturated monomers can be anionic or cationic.

Examples of water-soluble, polar, anionic ethylenically monounsaturated monomers include monomers containing acidic groups such as carboxylic groups, sulfonic groups, phosphonic groups, and the corresponding salts, e.g., monomers such as acrylic acid, methacrylic acid, maleic acid, maleic anhydride, fumaric acid, itaconic acid, 2-acrylamido-2-methylpropane sulphonic acid ("AMPS"), allyl sulfonic acid, vinyl sulfonic acid, allyl phosphonic acid, vinyl phosphonic acid, and a combination comprising at least one of the foregoing.

Examples of water-soluble, polar, cationic ethylenically monounsaturated monomers include N,N-di($C_1$-$C_8$ alkyl) amino($C_1$-$C_8$ alkyl) (meth)acrylates such as N,N-dimethylaminoethyl (meth)acrylate, N,N-di-($C_1$-$C_8$ alkyl)amino($C_1$-$C_8$ alkyl) (meth)methacrylates such as N,N-dimethylamino ethyl (meth)acrylate, including quatemized forms e.g., methyl chloride quatemized forms, diallyldimethyl ammonium chloride, N,N-di($C_1$-$C_8$)alkylamino($C_1$-$C_8$)alkyl (meth)acrylamide and the quatemized equivalents such as acrylamidopropyl trimethylammonium chloride, and a combination comprising at least one of the foregoing.

Relative amounts of each monomer are selected to provide an organic network polymer having the desired characteristics.

In an embodiment, the monomer composition comprises 100% by weight (wt. %) of water-soluble, polar, nonionic ethylenically monounsaturated monomers, for example the above acrylamide, N-substituted (meth)acrylamides and N,N-disubstituted (meth)acrylamides, with specific examples including N-isopropyl acrylamide, N-isopropyl methacrylamide, N-n-propyl acrylamide, N-n-propyl methacrylamide, N-cyclopropyl acrylamide, N-cyclopropyl methacrylamide, N-ethoxyethyl acrylamide, N-ethoxyethyl methacrylamide, N-tetrahydrofurfuryl acrylamide, N-tetrahydrofurfuryl methacrylamide, N-ethyl acrylamide, N-ethyl-N-methyl acrylamide, N,N-diethyl acrylamide, N-methyl-N-n-propyl acrylamide, N-methyl-N-isopropyl acrylamide, N-acryloyl piperidine, N-acryloyl pyrrolidine, and a combination comprising at least one of the foregoing.

In another embodiment the monomer composition comprises, based on the total weight of the monomers, 0 to 80 wt. % of a water-soluble, polar, anionic ethylenically monounsaturated monomer, 0 to 80 wt. % of a water soluble, polar, cationic ethylenically monounsaturated monomer, and 20 to 100 wt. % of a water soluble, polar, nonionic ethylenically monounsaturated monomer, wherein the total amount sums up to 100% by weight.

For example, the total amount of the water soluble, polar, nonionic ethylenically monounsaturated monomer can be in the range of 40 to 100 wt. %, preferably from 50 to 100 wt. %, more preferably from 60 to 100 wt. %, and the amount of the water-soluble, polar, anionic or cationic ethylenically monounsaturated monomer can be in the range of 60 to 0 wt. %, preferably from 50 to 0 wt. %, 30 to 0 wt. %, more preferably from 20 to 0 wt. %.

In a specific embodiment, the monomer composition comprises 50 to 100 wt. %, preferably 60 to 100 wt. % of the water-soluble, polar, nonionic monomer and 50 to 0 wt. %, preferably 30 to 0 wt. % of the water-soluble polar anionic monomer.

More preferably the polymer is not amphoteric, i.e., either anionic or anionic and polar nonionic monomers, or cationic and polar nonionic monomers are chosen, or if anionic and cationic monomers are chosen (with or without polar nonionic monomers), then usually either one is in excess of the other one. Most preferably the anionic monomer is acrylic acid or a water-soluble salt thereof, optionally together with AMPS.

In some embodiments the monomer composition comprises a crosslinking monomer, in particular a water-soluble polyunsaturated monomer. Examples of such crosslinking, water-soluble, multi-ethylenically unsaturated monomers include methylenebisacrylamide, diacrylamidoacetic acid, polyol(meth)acrylates such as pentaerythritol tri(meth)acrylate or ethylene glycol di(meth)acrylate, tetraallyl ammonium chloride, triallyl cyanurate, and triallyl isocyanurate. The amount of cross-linking monomer usually depends on the desired chain length (or molecular weight) of the polymer chain segments of the crosslinked polymer, and can be, for example, 5 to 2000 parts per million by weight, preferably 5 ppm to 500 ppm and most preferably from 5 to 100 ppm, based on the total parts by weight of the monomer composition.

In addition, other copolymerizable monomers can be used in combination in an amount that does not significantly adversely affect the properties of the nanocomposite microgel, examples of which include (meth)acrylic monomers having amino acid residues such as a carboxyl group and an amino group, (meth)acrylic monomers having a polyethylene glycol or polypropylene glycol chain, amphipathic (meth) acrylic monomers having both a hydrophilic chain such as polyethylene glycol and a hydrophobic group such as a nonylphenyl group, and a combination comprising at least one of the foregoing monomers. The amount of the additional monomer is selected to provide the desired properties, and can be, for example, 0.01 to 10 wt. %, based on the total weight of the monomer composition.

The relative amounts of the nanoclay and the monomer composition can vary, depending on the desired characteristics of the nanocomposite polymer. In an embodiment, the aqueous phase comprises a weight ratio of the water-swellable nanoclay to the monomer composition of 0.01:1 to 10:1, more preferably 0.03:1 to 5:1, and particularly preferably 0.05:1 to 3:1. If the weight ratio is less than 0.01:1, the mechanical properties of the resulting nanocomposite microgel tend to be inadequate, while if the ratio exceeds 10, it can be difficult to disperse the nano clay.

The nanoclay and the monomer composition are combined in an aqueous medium to form the aqueous phase. There are no particular limitations on the aqueous medium provided that it dissolves the monomers, can form an water-in-oil emulsion as described herein, and allows the synthesis of the nanocomposite microgel. For example, the aqueous medium can contain water and a solvent and/or other compound miscible with water. In an embodiment, the aqueous medium contains water and no other organic solvent.

Optionally, a small amount of a complexing agent such as ethylene diamine tetraacetic acid (EDTA) can be present in the aqueous medium to scavenge any free metal ions that otherwise may adversely interfere with the polymerization reaction. Other complexing agents can be homologs of EDTA such as diethylenetriamine pentaacetic acid or methylene phosphonate complexing agents such as diethylenetriamine-pentamethylene phosphonate. The complexing agent can be present in an amount of 0.01 to 0.5% by weight based on the weight of monomer composition.

The oil phase contains a water-immiscible organic carrier and a surfactant effective to promote formation of the emulsion, i.e., an emulsifier.

The water-immiscible organic carrier can be any organic liquid suitable for forming an emulsion, provided that the carrier is inert and as such does not significantly adversely interfere with the polymerization reaction during formation of the nanocomposite microgels. Generally, the carrier is low-viscosity, in order to facilitate the preparation of water-in-oil emulsions containing a maximum concentration of hydrophilic polymer. Examples of carriers include a volatile oil, aromatic, aliphatic, and halogenated hydrocarbons, and a combination comprising at least one of the foregoing. Preferably the hydrocarbon is cyclohexane.

The emulsifier can be any surfactant for formation of a water-in-oil emulsion. The surfactant can have a hydrophilic/lipophilic balance (HLB) of 1 to 5. HLB value can be determined according to the Davis method ("Surfactants—Properties, Applications and Chemoecology", F. Kitahara, et al., ed., Kodansha Publishing, 1979, p. 24-27; which is incorporated herein by reference in its entirety).

Suitable surfactants include ionic, for example anionic and cationic, and nonionic surfactants. Nonionic surfactants are preferred. Exemplary nonionic surfactants are polyoxyethylene glycol alkyl ethers, polyoxypropylene glycol alkyl ethers, glucoside alkyl ethers, polyoxyethylene glycol octylphenol ethers, polyoxyethylene glycol alkylphenol ethers, glycerol alkyl esters, polyoxyethylene glycol sorbitan alkyl esters, sorbitane alkyl esters (Spans), cocamide MEA, cocamide DEA, dodecyldimethylamine oxide, block copolymers of polyethylene glycol and polypropylene glycol, polyethoxylated tallow amine (POEA), and the like.

Sorbitane alkyl esters are available under SPAN tradename. Among the sorbitane alkyl esters, sorbitan tristearate, sorbitane monostearate, sorbitane monooleate, and the like are suitable. Examples of particularly suitable sorbitane alkyl esters include sorbitane monooleate (e.g., SPAN 80®, CAS#1338-43-8, HLB 4.3).

The amount of emulsifier, including surfactant, can vary, and is selected to obtain the desired particle-size, for example 0.01 to 15 parts, based on total parts of the aqueous phase, but is dependent on a number of factors such as homogenization equipment and conditions, the nature of the aqueous phase and oil phase, as well as the emulsifier itself, as there are numerous emulsifiers to select from. Usually the amount of emulsifier is from 0.01 to 12 parts, 0.05 to 10 parts, 0.1 to 10 parts, 0.5 to 8 parts, 1 to 7 parts, based on total parts of the aqueous phase.

In addition to the carrier and emulsifier, the oil phase can further contain a plasticizer, for example $C_1$-$C_{10}$ alkyl esters of aliphatic dicarboxylic acids such as adipic acid, pimelic acid, suberic acid, azelaic acid, sebacic acid, e.g., diethyl adipate, dibutyl adipate, dipropyl adipate, dihexyl adipate, dioctyl adipate and di-isononyl adipate, $C_1$-$C_{10}$ alkyl esters of aliphatic tricarboxylic acids such as citric acid and trimellitic acid, e.g., tributyl citrate, acetyltributyl citrate, acetyltriethyl citrate, acetyltrihexyl citrate, butyryltrihexyl citrate, and trioctyl trimellitate, $C_8$-$C_{20}$ alkyl esters of phthalic acid including di-isononyl phthalate, di-isodecyl phthalate and di-undecyl phthalate, $C_8$-$C_{20}$ alkyl esters of phthalic acid, liquid polyester plasticizers, and combinations comprising at least one of the foregoing.

The oil phase can further comprise a polymer stabilizer, that is, a stabilizing amphiphilic copolymer, which leads to an improved thermal and/or shear stability of the microgel. Such polymer stabilizers are particularly useful where the nanocomposite microgel is isolated by a water or water/solvent azeotrope removal step by vacuum distillation, flash distillation, thin film evaporation, or other thermal methods. Stabilizing amphiphilic copolymers usually contain both hydrophobic and hydrophilic groups in the same copolymer, and are obtainable by polymerizing from 50 to 90% by weight of one or more water-immiscible alkyl (meth)acrylates monomers (e.g., $C_1$-$C_{20}$alkyl esters of acrylic acid or methacrylic acid, preferably mixtures thereof containing at least 20% by weight (on total monomer weight) of one or more $C_{12}$-$C_{20}$alkyl esters of acrylic acid or methacrylic acid) and from 10 to 50% by weight of one or more acidic, basic or quaternary amine monomers as described above. The stabilizing amphiphilic copolymer can be present in an amount of 0 to 10 wt. %, preferably 0.5 to 5 wt. %, based on the total amount of aqueous phase.

The water-in-oil emulsion further comprises a polymerization initiator, for example a redox couple, a thermal initiator, a photoinitiator, or a combination comprising a thermal initiator and a photoinitior.

Depending on the initiator and its mechanism of action, the initiator can be added to the aqueous phase, the oil phase, the combination of the aqueous phase and the oil phase before emulsification, or to the emulsion after it is formed.

Exemplary polymerization initiators are water soluble peroxide, such as alkali metal persulfates, alkaline earth metal persulfates, ammonium persulfates; water soluble azo compounds such as VA-044, V-50, V-501 (products of Wako Chemicals Co, Ltd.); and a water soluble radical initiator having poly(ethylene oxide) chains, and a combination comprising at least one of the foregoing. Potassium persulfate is preferred.

Thermal initiators, photoinitiators, or initiators inhibited by the presence of oxygen can be added at any time before polymerization. The initiator can be added directly to the desired phase, or alternatively, the polymerization initiator is first dissolved in a small amount of solvent and then dispersed in the aqueous medium or added to the oil phase.

Suitable solvents for this purpose have a HLB value of 8 or more, and can be, for example, polypropylene glycol diacrylates such as tripropylene glycol diacrylate, polyethylene glycol diacrylates, polypropylene glycol acrylates such as pentapropylene glycol acrylate, polyethylene glycol acrylates, methoxypolyethylene glycol acrylates such as methoxyethyl acrylate and methoxytriethylene glycol acrylate, nonylphenoxy polyethylene glycol acrylates, N-substituted acrylamides such as dimethyl acrylamide, hydroxyethyl acrylate and hydroxypropyl acrylate. Alternatively, amides such as dimethylacetoamide and dimethyl formamide; alcohols such as methanol and ethanol, tetrahydrofuran, and dimethyl sulfoxide, can be used, provided that the amount of such solvents do not significantly adversely affect formation of the emulsion.

The amount of initiator used can vary depending on the nature of the initiator. In an embodiment the amount of initiator is in the range from 0.01-1 wt. % over the aqueous phase.

The water-in-oil emulsion further comprises an accelerator. The accelerator can be added to the aqueous phase, the oil phase, the combination of the aqueous phase and the oil phase before emulsification, or to the emulsion after it is formed.

Examples of suitable accelerators include tetramethylethylenediamine (TEMED), β-dimethylacrylaminopropionitrile, and the like. Tetramethylethylenediamine is preferred. The amount of accelerator used can vary, but usually the amount of accelerator is in the range from 0.01-1 wt. % over the aqueous phase.

The nanocomposite microgels are prepared from the foregoing aqueous and oil phases by reverse-phase polymerization in water-in-oil emulsion, as described, for example, in WO 97/34945. The term "reverse-phase polymerization" is understood by those skilled in the art to mean polymerization in water-in-oil emulsions, characterized by the formation of inverse micelles. In inverse micelles, the hydrophilic groups are sequestered in the micelle core and the hydrophobic groups extend away from the center. Aqueous phase-filled micelles act as mini-reactors for the polymerization of hydrogels, resulting in nanocomposite microgels.

In an embodiment, the aqueous phase is prepared comprising the nanoclay, the monomer composition, and water, as well as any optional additives such as accelerators, initiators and metal complexing agents. The oil phase is prepared separately, and includes the carrier, emulsifying surfactant, and optionally other additives, such as a plasticizer, for example di-isodecyl phthalate, and a polymeric stabilizer.

The aqueous and the oil phases are mixed together using a suitable agitation equipment, such as a homogenizer, or mechanical stirring, to form a fine and stable s of the aqueous phase in the carrier phase. The emulsion is subjected to reverse-phase suspension polymerization. Reverse phase polymerization is usually by maintaining the emulsion at a preselected temperature for preselected period of time. Maintaining the emulsion can be with and without stirring at the preselected temperature over the preselected period of time.

Reverse phase polymerization is usually in the temperature range from 0 to 100° C., 20 to 80° C., 30 to 70° C., preferably from 40 to 60° C., more preferably at 50° C. At the preselected temperature, the emulsion is usually maintained for a period of up to 12 hours. This includes reverse-polymerizing the emulsion over a period of up to 10, 8, 6 and 4 hours. Maintaining the emulsion for reverse polymerization overnight is preferable.

As described above, an accelerator and polymerization initiator can be present in the aqueous phase, the oil phase, or added to the combination before or after emulsification.

Polymerization of this homogenized, unpolymerized emulsion is then initiated with a suitable initiator. Optionally, a suitable accelerator may be present.

Where the initiator and/or accelerator are/is inhibited by the presence of oxygen, polymerization can be facilitated by placing the emulsion under an inert atmosphere. Placing the emulsion under an inert atmosphere may be before and/or during polymerization. In an embodiment the initiator is a thermal initiator, and initiation is by heating the emulsion under an inert atmosphere.

After the polymerization, the nanocomposite microgel is isolated. Isolation can be by precipitation, for example by addition of an anti-solvent, by spray-drying, by filtration, or by microfiltration. It is advantageous to isolate the nanocomposite microgel compositions by precipitation in a suitable anti-solvent. Examples of anti-solvents include ketones, alcohols, ethers, and the like, example of which are acetone, ethanol, methanol, isopropanol, n-butanol, and tert-butanol. Preferably the anti-solvent is acetone. Alternatively, isolation can be by removing the carrier and optionally water from the emulsion or dispersion, e.g., by distillation.

The isolated microgel can be further dried to obtain the nanocomposite microgel particles. In some embodiments, the particles are obtained in the form of agglomerates of primary particles that can be deagglomerated by the shear forces involved in subsequent use of the particles, or by the deliberate inclusion of a comminution step or by deliberately using more intensive processing conditions to achieve the necessary deagglomeration. However, since the primary particles are only weakly agglomerated, deagglomeration is achieved without resorting to exceptional process conditions, in particular the high-energy conditions such as are used in the prior art. It is advantageous that the particles are weakly agglomerated to avoid or minimize any respiratory hazard that would attend dry powder composed substantially of primary particles with a mean diameter of 1 to 10 micrometers.

The primary nanocomposite microgel particles have a mean diameter in the range from 1 to 10 micrometers. The diameter can be determined by a number of methods, for example by scanning electron microscopy, laser diffraction using a Sympatec Helos H1539 with R1 lens and Quixel dispersion system, and the like. In an embodiment, the primary nanocomposite microgel particles have a diameter as measured by scanning electron microscopy (SEM) of from 1 to 10 micrometers, 1 to 8 micrometers, or from 1 to 5 micrometers, or 2 to 10, 3 to 10, 4 to 10 or from 5 to 10 micrometers.

In another advantageous feature, the nanocomposite microgel particles are obtained (after drying) as a fluffy, shapeless, powder-like solid. Thus, the form of the particles are not determined by the shape of a mold, or obtained as a unitary film that must be reduced to particulate form.

The method of manufacture as described herein leads to highly crosslinked, high molecular weight crosslinked polymers, for example, as high as $M_w=5.5\times10^6$ g mol$^{-1}$ as measured by gel-permeation chromatography. In an embodiment, the polymers can have an $M_w=1\times10^3$ g mol$^{-1}$ to $5.5\times10^6$ g mol$^{-1}$, or $5\times10^3$ g mol$^{-1}$ to $1\times10^6$ g mol$^{-1}$ molecular as measured by gel-permeation chromatography. One method for determining $M_w$ is described by Kazutoshi Haraguchi et al., in Macromolecular Rapid Communications (2010) Vol. 31, pp. 718-723. Without being bound by specific theory, the high degree of cross-linking of the organic polymer compositions at the clay-polymer interface provides a unique organic-inorganic network structure exhibits extraordinary mechanical, optical, swelling/deswelling properties which can overcome the limitations of conventionally crosslinked hydrogels. See, Kazutoshi Haraguchi, Current Opinion in Solid State and Materials Science (2007) Vol. 11, pp. 47-51.

Where acid groups are present in the microgel, the acid groups can be, for example, 50 to 100% neutralized, more preferably 75 to 100% on a molar basis. The neutralization can be carried out by known methods such as applying bases to the corresponding acidic groups carrying hydrophilic polymer microparticles. The usual, most convenient practice is to neutralize the monomers prior to carrying out the polymerization reaction. Such bases suitable for neutralizing the acidic monomers can be e.g. alkali metal hydroxides such as NaOH or KOH as well as ammonia or amines such as mono-, di- or tri-ethanolamine, most preferably NaOH is chosen. In some cases it can be beneficial to neutralize up to 50% of the acid groups (on a molar basis) in the form of di-, tri- or polyvalent cationic salts such as polyamine salt or alkaline earth metal salt such as Mg(OH)$_2$, Ca(OH)$_2$ or Ba(OH)$_2$ as a means of controlling the degree and/or rate of swelling.

In an embodiment the nanocomposite microgels can be further crosslinked. Further cross-linking is understood to be distinct from, or in addition to, cross-linking by the nanoclay as discussed above. For example, di- or polyvalent metal ions can be used to confer a degree of further cross-linking to polymers containing acid groups, particularly carboxylic acid groups. Other compounds such as di- or polyamines can be used in a similar way. Preferably, further cross-linking is achieved through the use of a suitable water-soluble (or monomer phase soluble) di-, tri- or polyunsaturated polymerizable monomer, which usually is present in the aqueous monomer solution as described above.

The nanocomposite microgels are useful in a variety of applications in the form of dry, carrier-free microparticles. Useful articles include those for absorbing free unwanted water or water-based liquids such as spillage mats; water-absorbent fibers, yarns or fabrics or textiles for mopping up water or water-based liquids, e.g., household applications and applications such as wrappings for cable bundles to protect against water ingress, or for components of wound dressings to confer greater absorptivity, breathability, or moisture transfer properties as well as dressing adhesives; articles for removing moisture from air to treat moist, humid environments. The nanocomposite microgels can also be used as rheology modifier, such as thickener. A significant advantage of the nanocomposite microgels in such a dry, carrier free form is the ability to produce water swellable compounds that do not require the addition of large amount of an oily fluid, for example water-swelling seals, e.g., waterstops for construction joints, as well as rubber water-swelling oil drilling seals; water-swelling mastics, caulks or sealants; water swelling coatings or layers attached to, or used in conjunction with, water-resistant membranes, layers or coatings, and the like; and moisture vapor permeable films, membranes, and coatings. Exemplary applications also include the oil and gas industry.

In an embodiment, the nanocomposite microgels are useful in water-swellable compositions comprising a combination of a non-water-swelling thermoplastic or elastomeric polymer (also referred to as "base polymer") and the nanocomposite microgel. A thermoplastic polymer is defined as a polymeric material that softens and melts when exposed to elevated temperatures and generally return to its original condition, i.e., its original physical state, when cooled to ambient temperatures. "Elastomeric polymer" as used herein is a generic term for substances emulating natural rubber in that they stretch under tension, have a high tensile strength, retract rapidly, and substantially recover their original dimensions. "Non-water-swelling polymer" means that the polymer does not swell in water or does not swell significantly in water. For example, a non-water-swelling polymer absorbs less than 1 g water/g polymer, or less than 0.5 g water/g polymer or less than 0.2 g water/g polymer, or even less than 0.1 g water/g polymer. Examples of the thermoplastic or elastomeric polymers, or polymers that can be plasticized include polyethylene-co-vinyl acetate, polyvinyl butyral, polyvinyl chloride (PVC), polystyrene, polyacrylics, polyamides, thermoplastic polyurethane, rubbers such as natural rubber, nitrile-butadiene rubber (NBR), hydrogenated nitrile rubber (HNBR), carboxylated nitrile rubber (XNBR), carboxylated hydrogenated nitrile rubber (XHNBR), styrene-butadiene rubber (SBR), polybutenes, polybutadienes, polyisoprenes, polyisobutylene-isoprene, fluorinated rubbers, perfluoroelastomer (FEKM) chlorosulphonated polyethylene, silicone, polychloroprene, butyl rubbers, ethylene-propylene-diene rubber (EPDM), ethylene-propylene rubber (EPR), polystyrene-co-isobutylene alkyd resins, phenolic resins, aminoplast resins, polyurethanes, and polysulfide rubbers. In specific embodiments, the base polymers include nitrile rubber (NBR), hydrogenated nitrile rubber (HNBR), carboxylated nitrile rubber (XNBR), carboxylated hydrogenated nitrile rubber (XHNBR), silicone rubber, ethylene-propylene-diene copolymer (EPDM), fluoroelastomer (FKM, FEPM), perfluoroelastomer (FFKM), or a combination comprising at least one of the foregoing.

The relative amount of each of non-water-swelling thermoplastic or elastomeric polymer and the nanocomposite microgel can vary depending on the desired properties. In an embodiment, the water-swellable compositions comprise 30 to 95 wt. %, preferably 40 to 90 wt. %, most preferably 50 to 85 wt. % of the thermoplastic or elastomeric polymer, and 5 to 70 wt. %, preferably 10 to 60 wt. %, most preferably 15 to 50 wt. % of the nanocomposite microgel particles. In another embodiment, the water-swellable compositions comprise 20 to 150 parts by weight, 30 to 150 parts by weight, or 20 to 140 parts by weight of the nanocomposite microgel per one hundred parts by weight of the base polymer.

Additives can be further present in the composition to provide desired processing or final properties. Examples of additives include lubricants, process oils, antistatic agents such as glycerol monostearate and glycerol monooleate, ethoxylated alcohol as an antistatic agent and/or fluidizing agent for PVC plastisols, flame retardant, vulcanization accelerators, vulcanization aids, aging retarders, coloring agents such as pigments and dyes, wetting agents, acid scavengers, heat stabilizers, defoamers, blowing agents, fillers such as calcium carbonate, carbon black, clay, silica and additional plasticizers in addition to the plasticizer introduced due to its presence as the carrier fluid of the hydrophilic polymer microparticle. Such additives (c) can be added in amounts depending on the desired effect, which can easily be determined by a person skilled in the art. Usually the additives are added in amounts in the range of from 1 to 50% by weight, 0 to 20% by weight, based on the total amount of the composition. A second hydrophilic material such as finely divided sodium or calcium bentonite or silica is also used. Such materials may be used to contribute directly to the expansion of the elastomeric composition or to help transport water to the microparticulate hydrophilic polymer.

In specific embodiments, the water-swellable compositions further comprise a cellulose component, such as carboxy methyl cellulose (CMC), hydroxypropylmethyl cellulose (HPMC) or methylcellulose (MC), or a combination comprising at least one of the foregoing. When used, the cellulose component can be present at 50 to 200 parts by weight or 100 to 200 parts by weight per hundred parts by weight of the base polymer.

The water-swellable compositions can be prepared using conventional processes and methods. For example, the components, including the water-insoluble thermoplastic or elastomeric polymer, the nanocomposite microgel particles, as dispersion or as powder, and optional additives as desired, can be pre-mixed using a high-shear mixer such as a Banbury mixer. Such high-shear mixing usually generates heat that will soften the base thermoplastic or elastomeric polymer, and promote the dispersion of nanocomposite microgel particles throughout the mixture. Compositions including thermoplastic polymers such as PVC can be further processed into a sheet or shaped article by extrusion, injection molding, or another thermal technique. Rubbers can be processed similarly and are usually cured or vulcanized during shaping at high temperature through the action of a curing or vulcanization aid.

The foregoing nanocomposite microgels and water-swellable compositions are particularly useful as sealant materials for example as waterstops for non-moving construction joints or in the oil drilling industry. Other articles include open-hole completions packers, zonal isolation with inflow control screens, redundant liner-top isolation, scab liners, water shutoffs, feed through packers for Intelligent Production Systems (IPS), debris barriers, and cement enhancements.

The water-swellable compositions can absorb at least 25% by weight of water based on the original weight of the water-swellable compositions, preferably at least 50% and most preferably at least 100%, in tests using demineralized water. In a particularly advantageous feature, the water-swellable compositions of the disclosure, which comprise primary nanocomposite microgel particles having a mean diameter of 1 to 10 micrometers, have enhanced swelling, for example, greater swelling ratio and faster swelling rate, in the presence of high salinity monovalent brines such as NaCl, NaBr, and KCl, as well as divalent brines such as $CaCl_2$ as compared to compositions containing conventional super absorbent polymers such as acrylate copolymers when tested under same conditions. The water-swellable compositions also have improved mechanical performance such as elasticity due to the presence of nanocomposite microgels. Further, the water-swellable compositions have better long term stability as compared to compositions containing conventional super absorbent polymers. Without wishing to be bound by theory, it is believed that nanocomposite microgels comprising primary nanocomposite microgel particles having a mean diameter of 1 to 10 microns can be kept in the base polymer even after swelling whereas convention super absorbent polymers can leach out from the base polymer, leading to deswelling.

In order that the invention disclosed herein may be more efficiently understood, the following examples are provided. These examples are for illustrative purposes only and are not to be construed as limiting the invention in any manner.

EXAMPLES

Materials

Laponite RD nanoclay, a synthetic layered silicate, was obtained from BYK Additives & Instruments (Formerly Rockwood Additives) and used without further purification.

SAP powder, a super absorbent polymer, was obtained from Ciba.

Nipol 1014 is the Acrylonitrile butadiene rubber (NBR) supplied by Zeon Chemicals.

Tetramethylethylenediamine (TEMED) accelerator was provided by Sigma Aldrich and used without further purification.

Potassium persulfate (KPS) initiator was obtained from Sigma Aldrich and used without further purification.

SPAN 80 surfactant, chemical name sorbitane monooleate, CAS #1338-43-8, was obtained from Sigma Aldrich and used without further purification.

Acrylamide and acrylic acid were obtained from Sigma Aldrich and used without further purification.

Acrylamido-2-methylpropane-sulfonic acid (AMPS) was obtained from Sigma Aldrich and used as-is.

Naugard® 445, chemical name 4,4'bis(alpha, alpha-dimethylbenzyl) diphenylamine, was obtained from Chemtura.

Processing aid Vanfre® AP-2, which contains 30-50 wt % wax, 10-30 wt % of di(2-ethylhexyl)phthalate, 10-30 wt % of oleic acid, and 10-20 wt % of zinc compounds, was obtained from Vanderbilt Chemicals.

Accelerator MBTS, chemical name 2,2'-dibenzothiazyl disulfide, was obtained from Akrochem.

Methods.

Scanning electron microscopy images were recorded using a SEM Quanta 600 scanning electron microscope.

Thermogravimetric analysis (TGA) was performed using a TGA Q500 instrument, at a heating rate of 10° C./min under nitrogen atmosphere.

The nanocomposite microgels were synthesized using reverse-phase suspension polymerization. Obtained dried nanocomposite microgels were subjected to SEM analysis to measure their particle size, that is, mean diameter.

The swelling test was performed on button samples of 1 inch in diameter and 0.5 inch in thickness. The buttons were immersed in the test fluid at 200° F. for swelling, and the volumes of the buttons were measured periodically.

Example 1

Nanocomposite Microgel Synthesis

Laponite RD (3 g) was added to vigorously-stirred deionized water (250 ml). After stirring for 1 h, acrylamide (21 g), acrylic acid (3 g), and 2-acrylamido-2-methylpropane sulfonic acid (6 g) were added to the solution. The aqueous solution was allowed to stir for 1 h, and then TEMED (240 μL) and KPS (1 g dissolved in 50 mL deionized water) were added.

Separately, an oil phase was prepared by admixing SPAN 80 (10 g) and cyclohexane (450 ml) using a magnetic stir bar.

The aqueous and oil phases were emulsified using a CAT X520 homogenizer for 5 minutes.

Subsequently, the resultant emulsion was transferred to a three neck flask equipped with a mechanical stirrer. The emulsion was sparged with nitrogen for 0.5 h (to remove oxygen).

Nitrogen blanketing was continued while the reaction mixture was allowed to polymerize at 50° C. overnight.

The polymerized emulsion was precipitated in vigorously-stirred acetone. The combined precipitates were filtered to collect a filter cake which was washed with acetone.

The filter cake was then dried overnight in a vacuum oven at 60° C. to yield a nanocomposite microgel product as a powder having a mean diameter of from 2-10 μm.

FIG. 1 illustrates a SEM image of a nanocomposite microgel made in accordance with Example 1. It is seen that the mean diameter is in the range from 2-10 μm.

Figure 2:
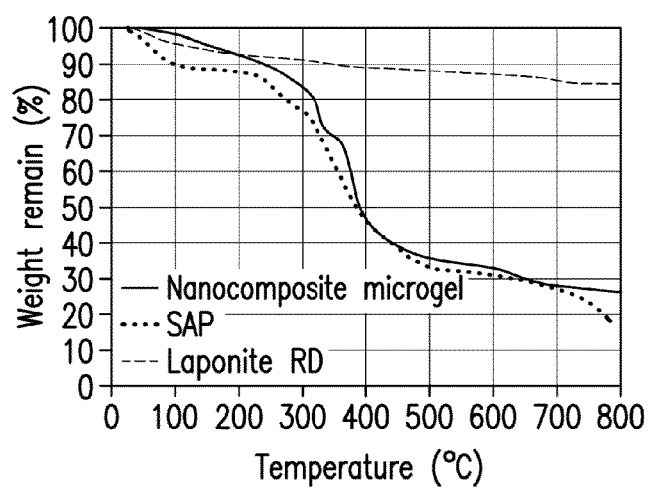
FIG. 2 shows TGA curves of nanocomposite microgel (middle curve), SAP powder (bottom curve), and Laponite RD (top curve) under nitrogen atmosphere.

FIG. 2 displays a comparison of TGA curves of a nanocomposite microgel made in accordance with Example 1, a conventional super absorbing polymer (SAP) and Laponite RD. The initial weight loss is related to loss of absorbed moisture. Backbone decomposition of the nanocomposite microgel starts above 300° C., as shown in FIG. 2.

The results of these comparison tests show that a nanocomposite microgel of the invention has a TGA profile comparable to that of a conventional super absorbing polymer. In contrast, minimal weight loss was observed for a nanoclay control. It is further seen that the presence of nanoclay does not affect the thermal stability of hydrogel.

Example 2

Swelling Experiments

The following procedure was used to compound swellable rubbers. Nipol 1014 (27.03 g) and Nipol 1312 (1.35 g) were firstly added into Brabender mixer, and then other ingredients including carbon black N550 (12.16 g), magnesium oxide (1.35 g), anti-oxidant Naugard 445 (0.54 g), processing aid Vanfre AP-2 (0.54 g), and the gels were added over a period of approximately 5 mins. The compounds were mixed at 30 rpm for 10 mins, and then taken out as a master batch. The master batch was added into the Brabender mixer again, followed by adding curative sulfur (0.12 g) and accelerator MBTS (0.12 g). The whole compound was thoroughly mixed for 10 mins. The compound was then milled on a 2-roll mill to form a sheet, which was further rolled into a rod, and cut to fit the button sample mold. The compound was cured in the mold at 300° F. for 75 mins under compression. Samples A-C were prepared using the above procedure and formulation, but with different amount of NC microgels. Sample B contained cellulose in addition to NC microgels. Sample D and sample E did not contain NC microgel and were used as control samples. Sample D was Baker Hughes water swelling compound WSP1 and sample E was Baker Hughes water swelling polymer compound WSP2.

The swelling properties of samples A-E were tested in 10 wt. % of calcium chloride at 200° F., 10 wt. % of NaBr at 200° F., and 3.5 wt. % NaCl at 200° F. respectively. The results are shown in FIGS. 3-5.

Figure 3:
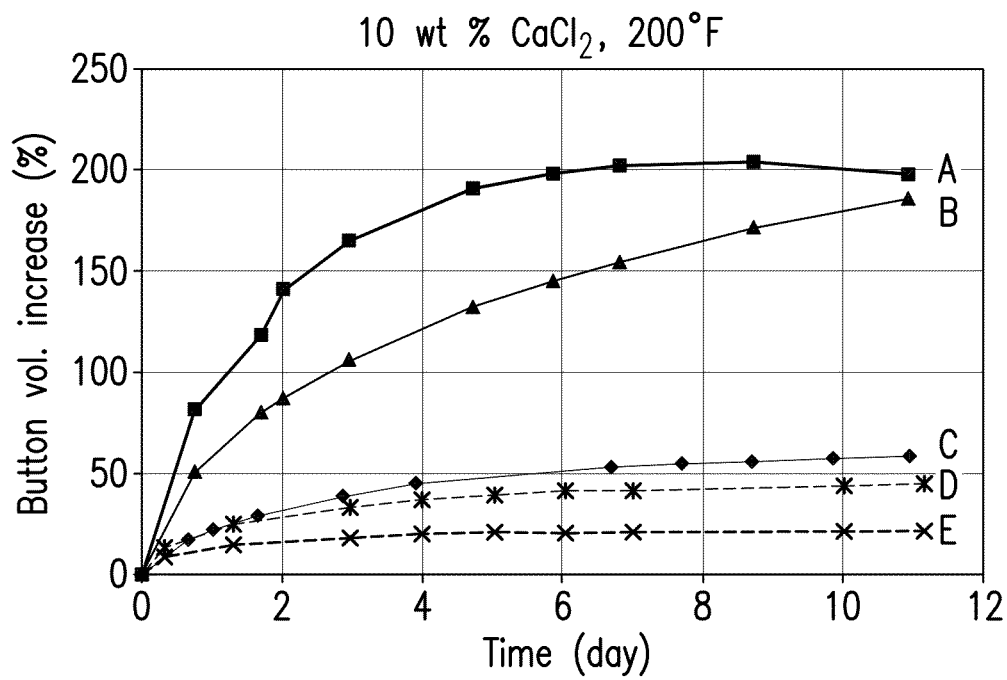
FIG. 3 shows swelling property comparison for samples containing Nanocomposite (NC) microgel and samples containing water swelling polymers WSP1 and WSP2 in 10 wt. % of calcium chloride at 200° F.

As shown in FIG. 3, the swelling rate and the swelling capacity in 10 wt. % of $CaCl_2$ increased dramatically for samples containing NC gels as compared to samples containing conventional super absorbent polymers.

Figure 4:
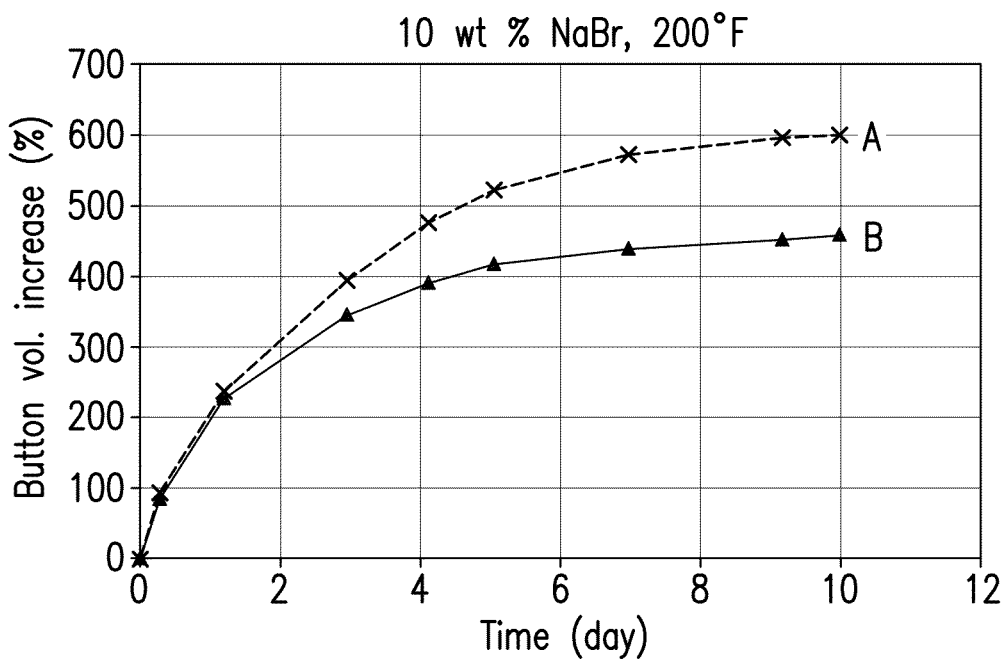
FIG. 4 shows swelling curves of samples containing different amounts of NC microgel in 10 wt. % of sodium bromide at 200° F.

FIG. 4 indicates that samples A and B, which contain NC microgel and NC microgel in combination with cellulose, achieved excellent swelling capacity in 10 wt. % of NaBr at 200° F.

Figure 5:
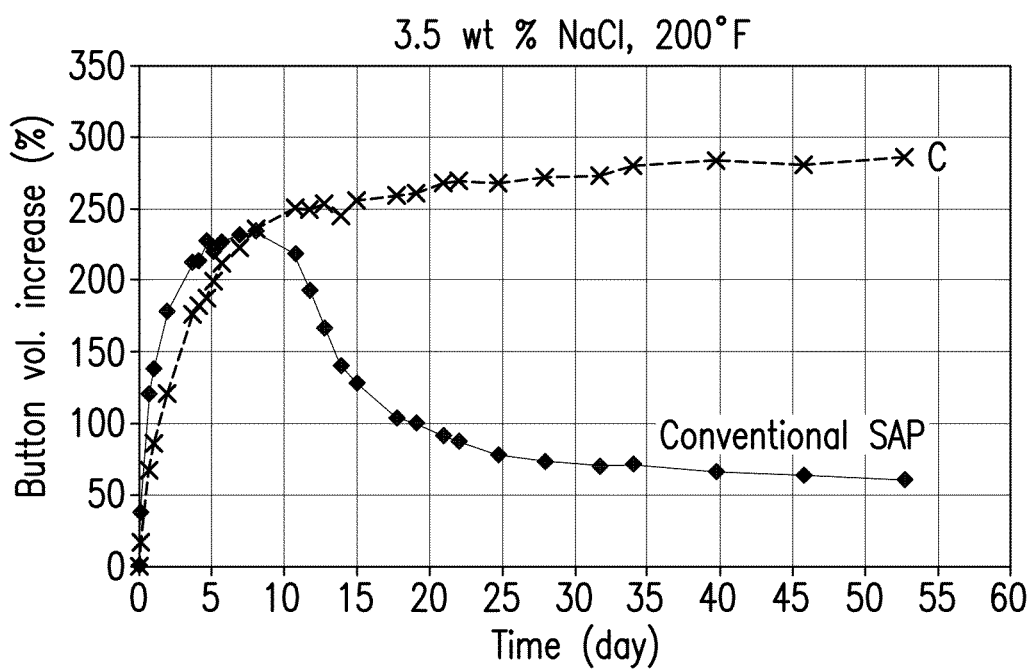
FIG. 5 shows swelling property comparison for samples containing NC microgel and a sample containing conventional SAP in 3.5 wt. % of sodium chloride at 200° F.

FIG. 5 shows that high swelling capacity was achieved for sample C, which contains NC microgel as compared to the same recipe but with conventional super absorbent polymers. Without wishing to be bound by theory, it is believed that NC microgel is kept in the NBR matrix even after swelling whereas the SAP can leach out from the NBR matrix, leading to deswelling. Accordingly, samples containing NC microgel of the disclosure have better long term stability as compared to samples containing conventional SAP.

The singular forms "a," "an," and "the" include plural referents unless the context clearly dictates otherwise. "Or" means "and/or."

The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group.

Unless defined otherwise, technical and scientific terms used herein have the same meaning as is commonly understood by one of skill in the art to which this invention belongs. A "combination" is inclusive of blends, mixtures, alloys, reaction products, and the like. The term "(meth)acryl" is inclusive of both the methacryl and acryl.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:
1. A water swellable composition comprising:
a base polymer; and
nanocomposite microgel particles comprising a three-dimensional network comprising a water-swellable nanoclay; and an organic network polymer;

wherein the nanocomposite microgel particles comprise primary nanocomposite microgel particles having a mean diameter of 1 to 10 micrometers; and wherein the nanocomposite microgel particles are present in an amount of 20 to 150 parts by weight based on one hundred parts by weight of the base polymer.

2. The water swellable composition of claim 1, wherein the base polymer is selected from nitrile rubber, hydrogenated nitrile rubber, carboxylated nitrile rubber, carboxylated hydrogenated nitrile rubber, silicone rubber, ethylene-propylene-diene copolymer, fluoroelastomer, perfluoroelastomer, or a combination comprising at least one of the foregoing.

3. The water swellable composition of claim 1, wherein a weight ratio of the water swellable nanoclay to the organic network polymer is 0.01:1 to 10:1.

4. The water swellable composition of claim 1, wherein the water-swellable nanoclay is synthetic layered silicate.

5. The water swellable composition of claim 1, wherein the organic network polymer is the polymerization product of a monomer composition comprising:
a water-soluble, polar, nonionic ethylenically monounsaturated monomer,
a water-soluble, polar, ionic ethylenically monounsaturated monomer, or
a combination comprising at least one of the foregoing monomers.

6. The water swellable composition of claim 5, wherein the water-soluble, polar, nonionic ethylenically monounsaturated monomer is acrylamide, methacrylamide, N—($C_1$-$C_8$ alkyl)(meth)acrylamide, N,N-di($C_1$-$C_8$ alkyl)acrylamide, vinyl alcohol, vinyl acetate, allyl alcohol, (meth)acrylic monomers having a sugar residue, (meth)acrylic monomers having a hydroxyl group, acrylonitrile, methacrylonitrile, or a combination comprising at least one of the foregoing monomers.

7. The water swellable composition of claim 5, wherein the water-soluble, polar, ionic ethylenically monounsaturated monomer is water-soluble, polar, anionic ethylenically monounsaturated monomer.

8. The water swellable composition of claim 7, wherein the water-soluble, polar, anionic ethylenically monounsaturated monomer is acrylic acid, methacrylic acid, maleic acid, maleic anhydride, fumaric acid, itaconic acid, 2-acrylamido-2-methylpropane sulfonic acid, allyl sulfonic acid, vinyl sulfonic acid, allyl phosphonic acid, vinyl phosphonic acid, or a combination comprising at least one of the foregoing monomers.

9. The water swellable composition of claim 5, wherein the water-soluble, polar, ionic ethylenically monounsaturated monomer is water-soluble, polar, cationic ethylenically monounsaturated monomer.

10. The water swellable composition of claim 5, wherein the monomer composition comprises:
20 to 100 wt. % of the water-soluble, polar, nonionic ethylenically monounsaturated monomer, and
0 to 80 wt. % of the water-soluble, polar, anionic ethylenically monounsaturated monomer, based on the total amounts of the monomers.

11. The water swellable composition of claim 5, wherein the water-swellable nanoclay is synthetic layered silicate, the water-soluble, polar, nonionic ethylenically monounsaturated monomer is acrylamide, and the water-soluble, polar, anionic ethylenically monounsaturated monomer is acrylic acid and 2-acrylamido-2-methylpropane sulfonic acid.

12. The water swellable composition of claim 1, wherein the organic network polymer is crosslinked via the water-swellable nanoclay.

13. A water swellable composition comprising:
a base polymer; and
nanocomposite microgel particles comprising a three-dimensional network comprising a water-swellable nanoclay; and an organic network polymer;
wherein the nanocomposite microgel particles comprises primary nanocomposite microgel particles having a mean diameter of 1 to 10 micrometers; and
wherein the water swellable composition further comprises carboxy methyl cellulose (CMC), hydroxypropylmethyl cellulose (HPMC) or methylcellulose (MC), or a combination comprising at least one of the foregoing.

14. An article comprising the water swellable composition of claim 1.

15. The article of claim 14, wherein the article is selected from waterstops, open-hole completions packers, zonal isolation with inflow control screens, redundant liner-top isolation, scab liners, water shutoffs, feed through packers for Intelligent Production Systems (IPS), debris barriers, and cement enhancements.

16. The water swellable composition of claim 13, wherein the base polymer wherein the base polymer is selected from nitrile rubber, hydrogenated nitrile rubber, carboxylated nitrile rubber, carboxylated hydrogenated nitrile rubber, silicone rubber, ethylene-propylene-diene copolymer, fluoroelastomer, perfluoroelastomer, or a combination comprising at least one of the foregoing.

17. The water swellable composition of claim 13, wherein the organic network polymer is the polymerization product of a monomer composition comprising the monomer composition comprises:
20 to 100 wt. % of a water-soluble, polar, nonionic ethylenically monounsaturated monomer, and
0 to 80 wt. % of a water-soluble, polar, anionic ethylenically monounsaturated monomer, based on the total amounts of the monomers.

18. The water swellable composition of claim 17, wherein the water-soluble, polar, nonionic ethylenically monounsaturated monomer is acrylamide, methacrylamide, N—($C_1$-$C_8$ alkyl)(meth)acrylamide, N,N-di($C_1$-$C_8$ alkyl)acrylamide, vinyl alcohol, vinyl acetate, allyl alcohol, (meth)acrylic monomers having a sugar residue, (meth)acrylic monomers having a hydroxyl group, acrylonitrile, methacrylonitrile, or a combination comprising at least one of the foregoing monomers.

19. The water swellable composition of claim 17, wherein the water-soluble, polar, anionic ethylenically monounsaturated monomer is acrylic acid, methacrylic acid, maleic acid, maleic anhydride, fumaric acid, itaconic acid, 2-acrylamido-2-methylpropane sulfonic acid, allyl sulfonic acid, vinyl sulfonic acid, allyl phosphonic acid, vinyl phosphonic acid, or a combination comprising at least one of the foregoing monomers.

20. An article comprising the water swellable composition of claim 13.

* * * * *